(12) United States Patent
Duc et al.

(10) Patent No.: US 8,399,561 B2
(45) Date of Patent: Mar. 19, 2013

(54) PROCESS FOR PREPARING HIGH IMPACT MONOVINYLAROMATIC POLYMERS IN THE PRESENCE OF A BORANE COMPLEX

(75) Inventors: Michel Duc, Pau (FR); Bruno Vuillemin, Lescar (FR); Denis Bertin, Marseilles (FR); Sylvain Marque, Marseilles (FR); Christophe Galindo, Magny-les-Hameaux (FR)

(73) Assignees: Total Petrochemicals France, Paris (FR); Centre National de la Recherche Scientifique, Paris (FR)

( * ) Notice: Subject to any disclaimer, the term of this patent is extended or adjusted under 35 U.S.C. 154(b) by 281 days.

(21) Appl. No.: 12/523,877

(22) PCT Filed: Jan. 21, 2008

(86) PCT No.: PCT/EP2008/050627
§ 371 (c)(1),
(2), (4) Date: May 10, 2010

(87) PCT Pub. No.: WO2008/090119
PCT Pub. Date: Jul. 31, 2008

(65) Prior Publication Data
US 2010/0240832 A1 Sep. 23, 2010

(30) Foreign Application Priority Data
Jan. 22, 2007 (EP) .................................. 07290093

(51) Int. Cl.
*C08F 255/08* (2006.01)
*C08F 279/02* (2006.01)
*C08F 279/04* (2006.01)
*C08F 4/52* (2006.01)
(52) U.S. Cl. ............... 525/80; 525/83; 525/84; 525/251
(58) Field of Classification Search .................... 525/80, 525/83, 84, 251
See application file for complete search history.

(56) References Cited

U.S. PATENT DOCUMENTS

| 4,952,627 A | 8/1990 | Morita et al. |
| 5,401,805 A * | 3/1995 | Chung et al. .................. 525/288 |
| 2006/0142503 A1* | 6/2006 | Lang et al. ................. 525/333.7 |

FOREIGN PATENT DOCUMENTS

| EP | 0732345 A | 9/1996 |
| JP | 2005330446 A | 12/2005 |
| JP | 2006348290 A | 12/2006 |

OTHER PUBLICATIONS

Ege, p. 297-299, Organic Chemistry Heath and Company, 1989.*
Ege, p. 297-299, Oraganic Chemistry, Heath and Company, 1989.*
Chung T. C. et al, "Synthesis of Ethylene-Propylene Rubber Graft Copolymers by Borane Approach", Macromolecules, ACS, Washington, DC, vol. 27, No. 1, Jan. 3, 1994, pp. 26-31, XP000418816.

* cited by examiner

*Primary Examiner* — Jeffrey Mullis

(57) ABSTRACT

The present invention relates to a process for preparing a high impact monovinylaromatic polymer comprising admixing a rubber, at least one monovinylaromatic monomer and optionally one or more comonomer in the presence of at least a borane complex of the $L-BH_3$ type wherein L is a Lewis base and polymerizing the monovinylaromatic monomer.

The borane complex initiator, L may be an ether (e.g THF, tetrahydrofurane), a thioether (e.g dimethylthioether) or an amine. A preferred complex is an amine borane such as by way of example triethylamine borane.

The present invention also relates to a high impact monovinylaromatic polymer having a weight ratio of grafted monovinylaromatic monomer and optional comonomer to the initial monovinylaromatic monomer and optional comonomer above 0.1%, advantageously above 2% and preferably in the range 2 to 4%.

The invention is of particular interest to make high impact polystyrene.

16 Claims, No Drawings

US 8,399,561 B2

PROCESS FOR PREPARING HIGH IMPACT MONOVINYLAROMATIC POLYMERS IN THE PRESENCE OF A BORANE COMPLEX

FIELD OF THE INVENTION

The present invention relates to a process for preparing high impact monovinylaromatic polymers. The present invention particularly relates to a process for the production of elastomer-modified high-impact monovinylaromatic polymers.

BACKGROUND OF THE INVENTION

This invention is directed to a continuous process for the manufacture of elastomer-modified monovinylaromatic polymers such as high impact polystyrene (HIPS). Rubber-reinforced polymers of monovinylaromatic compounds, such as styrene, alphamethyl styrene and ring-substituted styrenes are desirable for a variety of uses. More particularly, rubber reinforced polymers of styrene have included therein discrete particles of a crosslinked rubber, for example, polybutadiene, the said discrete particles of rubber being dispersed throughout the styrene polymer matrix and in addition said particles of rubber contain polystyrene inclusions. HIPS can be used in a variety of applications including refrigerator linings, packaging applications, furniture, household appliances and toys. Such HIPS are described in WO 01-68765, EP 1148086, U.S. Pat. No. 6,825,270, EP 770632, EP 1251143, EP 620236, US 2005-0070662, U.S. Pat. No. 6,569,941 and EP 664303.

The process for making HIPS is well known to those skilled in the art and consists of polymerizing styrene monomer in the presence of dissolved rubber. Polymerization of styrene, and optionally a comonomer, is initiated by heating and/or by an initiator, by way of example a radical initiator. The rubber is "dissolved" in the styrene monomer (actually the rubber is infinitely swollen with the monomer). The usual rubber types utilized in the manufacture of HIPS include polybutadiene (PB), styrene-butadiene rubber (SBR), and styrene-butadiene-styrene rubber (SBS). Polystyrene is initially formed from the styrene monomer within the homogeneous rubber solution in styrene. At the beginning of the polymerization the reacting solution is at a point prior to the rubber/styrene inversion point, i.e. the point at which the solution being reacted goes from polystyrene particles in a rubber/styrene monomer matrix to rubber particles in a polystyrene matrix. When the degree of polymerization is about equal to the weight % of rubber in the system, it inverts e.g. the styrene/styrene polymer phase becomes continuous and the rubber phase becomes discontinuous. Styrene is polymerized around and within the rubber particles which leads to polystyrene inclusions in the rubber particles. A portion of the styrene is polymerized by grafting on the rubber, another portion is homopolymerized, said portion is referred to as a "non-grafting" polymerization. In HIPS a part of the styrene may be replaced by unsaturated monomers copolymerizable with styrene such as other monovinylaromatic monomers, alkyl esters of acrylic or methacrylic acid and acrylonitrile. The same mechanism of "grafting" and "non-grafting" occurs with the styrene comonomer, which means one portion of the styrene and of the comonomer are polymerized by grafting on the rubber, another portion of the styrene and of the comonomer are copolymerized. The properties of HIPS are related to the amount of rubber, the type of rubber, the rubber particles size as well as the polystyrene included in the rubber particles. The proportion of styrene, and the optional comonomer, which is grafted (polymerized by the "grafting" way) is linked to the rubber particles size as well as to the amount of polystyrene included in the rubber particles.

A lot of prior art has already described such processes.

EP 1251143 A1 describes a method for improving the environmental stress crack resistance of an elastomer-modified monovinylaromatic polymer material, comprising:
introducing a monovinylaromatic monomer feed stream into a polymerization reactor;
introducing an elastomer feed stream into said polymerization reactor;
introducing a polymerization initiator compound into said reactor, said initiator compound comprising at least one perketal in amounts of about 200 parts per million (ppm), by weight, and at least one peroxycarbonate in amounts ranging from about 150 to about 800 ppm, by weight;
said perketal comprises Lupersol L-231 and said peroxycarbonate comprises t-Amyl 2-Ethylhexyl peroxycarbonate; and
reacting said monomer, said initiator compound, and elastomer to form an elastomer-modified monovinylaromatic polymer having high ESCR value.

This combination of initiators increases the grafting level.

EP1245599A2 relates to a process for the continuous production of high impact polystyrene wherein styrene monomer is polymerized in the presence of an elastomer dissolved therein, said process having at least one continuous-stirred tank reactor, the improvement comprising utilizing as an initial reactor, an elongated stirred tank reactor having plugflow characteristics, and wherein said elongated stirred tank reactor has a reaction zone having a length to diameter ratio exceeding about 2 and utilizes advantageously an upflow configuration. Advantageously there is an absence of a continuously operating preheater located prior to the elongated reactor. Advantageously an initiator in amounts of at least 100 ppm are utilized in the styrene monomer/elastomer solution in said elongated reactor. Advantageously said elongated reactor reaction zone has a height to diameter ratio of about 3 to about 4. Advantageously said elongated reactor comprises at least three reaction zones, a bottom preinversion zone, a middle inversion zone, and an upper heat vaporization zone. Grafting is calculated from the gel to rubber ratio. The percent gel is measured by first dissolving the resin in toluene, separating the gel fraction by centrifugation, and then drying the wet gel. The percent gel is then calculated from this dried residue by the formula: Percent Gel=100×dried gel weight, divided by the initial weight of the sample. The percent rubber is measured by the Iodine Monochloride (I—Cl) titration method.

WO 2005 033176 relates to a process for preparing a high impact polystyrene comprising admixing a rubber and styrene monomer in the presence of at least two polymerization initiators and polymerizing the styrene wherein at least one of the at least two polymerization initiators is a grafting initiator and at least one of the at least two polymerization initiators is a non-grafting initiator. The rubber may be selected from the group consisting of polybutadiene, styrene-butadiene rubber, styrene-butadiene-styrene rubber, natural rubber, and mixtures thereof. The grafting initiator is advantageously selected from the group consisting of 1,1-di-(t-butylperoxy) cyclohexane; 1,1-di-(t-amylperoxy)cyclohexane); 1,1-di-(t-butylperoxy)-3,3,5-trimethyl-cyclohexane; 00-t-amyl-0-(2-ethylbexyl monoperoxy-carbonate); OO-t-butyl O-isopropyl monoperoxy-carbonate; OO-t-butyl-0-(2-ethylhexyl) monoperoxy-carbonate; butyl 4,4-di(t-butylperoxy)valerate; Ethyl 3,3-Di-(t-butylperoxy)butyrate; and mixtures thereof. The non-grafting initiator is advantageously selected from the group consisting of 2,2'-azobis(isobutyronitrile), 2,2'-azobis(2-methylbutyronitrile), lauroyl peroxide, decanoyl peroxide, and mixtures thereof.

JP 20053305446 A published on 2 Dec. 2005 describes styrene polymerization in the presence of oxygen and amine boranes, but polymerization is made without rubber.

It has been discovered that the use of boranes complexes as initiators in the process for the production of elastomer-modified high-impact monovinylaromatic polymers increases the ratio of grafted monovinylaromatic monomer to the non-grafted monomer.

SUMMARY OF THE INVENTION

The present invention relates to a process for preparing a high impact monovinylaromatic polymer comprising admixing a rubber, at least one monovinylaromatic monomer and optionally one or more comonomer in the presence of at least a borane complex of the $L-BH_3$ type wherein L is a Lewis base and polymerizing the monovinylaromatic monomer.

The present invention also relates to the high impact monovinylaromatic polymer thus obtained.

The present invention also relates to a high impact monovinylaromatic polymer having a weight ratio of grafted monovinylaromatic monomer and optional comonomer to the initial monovinylaromatic monomer and optional comonomer above 0.1%, advantageously above 2% and preferably in the range 2 to 4%. The "initial monovinylaromatic monomer and optional comonomer" means the monomers effectively used to make the high impact monovinylaromatic polymer, it doesn't comprise the monomers recovered by degasing the high impact monovinylaromatic polymer. The amount of grafted monomer is measured by liquid chromatography at the critical absorption point as described by H. Pash, D. Braun and E. Esser in "Macromolecules Chromatographic investigation in the critical range of liquid chromatography", XII, Analysis of block copolymers of styrene and butadiene, Int. J. Anal. Charact. 4, 501-514).

DETAILED DESCRIPTION OF THE INVENTION

As regards the monovinylaromatic monomer, it relates to any aromatic having a vinyl function. By way of example mention may be made of styrene, vinyl toluene, alphamethylstyrene, alphaethylstyrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert.-butyl-3-styrene, dichloro-2,4-styrene, dichloro-2,6-styrene, vinyl-1-naphtalene and vinylanthracene. It would not depart from the scope of the invention to use more than one monovinylaromatic monomer. A part of the monovinylaromatic monomer may be replaced by unsaturated monomers copolymerizable with styrene. By way of example mention may be made of alkyl esters of acrylic or methacrylc acid, acrylonitrile and methacrylonitrile. The proportion of comonomer may be from 0 to 50% by weight for respectively 100 to 50% of the monovinylaromatic monomer.

As regards the rubber, mention may be made of EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene, isoprene-acrylonitrile copolymer, SBR (Styrene butadiene rubber), and copolymers having styrene blocks. More particularly the copolymers having styrene blocks are advantageously copolymers with styrene blocks and blocks made of butadiene or isoprene or of a mixture butadiene/isoprene. These block copolymers can be linear block copolymers or star block copolymers, hydrogenated and/or functionalized. These copolymers are described in ULLMANN'S ENCYCLOPEDIA OF INDUSTRIAL CHEMISTRY, fifth edition (1995) Vol A26, pages 655-659. They are sold by Total Petrochemicals under the trade mark Finaclear®, by BASF under the trade mark Styrolux® and under the trade mark K-Resin® by Chevron Phillips Chemical. It would not depart from the scope of the invention to use more than one rubber.

The rubber is present in the monovinylaromatic polymer in an amount up to 35% by weight of the high impact monovinylaromatic polymer (the monovinylaromatic polymer containing the rubber) which means up to 35% of rubber and at least 65% of the polymerized, grafted and non-grafted, monovinylaromatic monomer and optional comonomer. Advantageously the rubber is present in the monovinylaromatic polymer in an amount from about 1 to 20% for respectively 99 to 80% of the polymerized, grafted and non-grafted, monovinylaromatic monomer and optional comonomer. More advantageously the rubber is present in the monovinylaromatic polymer in an amount from about 2 to 10% for respectively 98 to 90% of the polymerized, grafted and non-grafted, monovinylaromatic monomer and optional comonomer.

In a specific embodiment the monovinylaromatic polymer comprises:
i) from 60 to 100 weight % of one or more $C_{8-12}$ monovinylaromatic monomers; and
ii) from 0 to 40 weight % of one or more monomers selected from the group consisting of $C_{1-4}$ alkyl esters of acrylic or methacrylc acid and acrylonitrile and methacrylonitrile; which polymer may contain from 1 to 20 weight %, advantageously 2 to 10% of one or more rubbery polymers.

By way of example rubbery polymers can be selected from the group consisting of:
a) co- and homopolymers of $C_{4-6}$ conjugated diolefins,
b) copolymers comprising from 60 to 85 weight % of one or more $C_{4-6}$ conjugated diolefins and from 15 to 40 weight % of a monomer selected from the group consisting of acrylonitrile and methacrylonitrile and
c) copolymers comprising from 20 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-6}$ conjugated diolefins. The rubber may be prepared by a number of methods, preferably by emulsion or solution polymerization. These processes are well known to those skilled in the art.

As regards the borane complex initiator, L may be an ether (e.g THF, tetrahydrofurane), a thioether (e.g dimethylthioether) or an amine. A preferred complex is an amine borane such as by way of example triethylamine borane. It would not depart from the scope of the invention to use more than one borane complex initiator. It would not depart from the scope of the invention to use another type of initiator in addition of the borane complex initiator. It would not depart from the scope of the invention to use a borane complex initiator at the beginning of the polymerization (roughly before the inversion phase) and then at a late stage another type of initiator. The proportion of the borane complex initiator ranges from 1 to 10000 mg for 1000 g of monovinylaromatic monomer to be polymerized. More preferably, the borane complex initiator is introduced in the polymerization system within a range of 50 to 200 ppm with respect to the weight of initial vinylaromatic monomer to be polymerized.

As regards the polymerization, it is carried out in a conventional manner by bulk polymerization, solution polymerization, or polymerization in aqueous dispersion, the rubber first being dissolved in the polymerizable monomer and this solution then being subjected to polymerization in the presence of the borane complex initiator. Advantageously the process of the invention is carried out as a diluted bulk polymerization process. When using diluted bulk polymerization, the starting solution may be mixed with up to about ten percent (10%) by weight, based on the monovinylaromatic monomer employed, of an inert solvent so as to lower the polymerization bulk viscosity, to moderate polymerization heat and to improve thermal exchanges and heat homogeneity within the bulk. Suitable diluents include aromatic solvents such as ethylbenzene, toluene, xylenes, cyclohexane, and aliphatic hydrocarbon solvents, such as dodecane, and mixtures thereof. Any solvent useful to improve heat homogeneity within the bulk during polymerization, that can be removed after polymerization of the monovinylaromatic monomer, and that does not interfere with the polymerization of the monovinylaromatic monomer and the optional comonomer, can be used with the process of the present invention.

Suitable chain transfer agents, e.g. mercaptans or alphamethyl styrene dimer, may also be added to control polymer molecular weight and rubber particle size.

The rubber is "dissolved" in the monovinylaromatic monomer (actually the rubber is infinitely swollen with the monomer). Monovinylaromatic polymer is initially formed from the monovinylaromatic monomer within the homogeneous rubber solution in monovinylaromatic monomer. At the beginning of the polymerization the reacting solution is at a point prior to the rubber/monovinylaromatic monomer inversion point, i.e. the point at which the solution being reacted goes from monovinylaromatic polymer particles in a rubber/monovinylaromatic monomer matrix to rubber particles in a monovinylaromatic polymer matrix. In other words when the degree of polymerization is about equal to the weight % of rubber in the system it inverts e.g. the monovinylaromatic monomer/monovinylaromatic polymer phase becomes continuous and the rubber phase becomes discontinuous. Monovinylaromatic monomer is polymerized around and within the rubber particles which leads to monovinylaromatic polymer inclusions in the rubber particles. A portion of the monovinylaromatic monomer is polymerized by grafting on the rubber, another portion is homopolymerized, said portion is referred to as a "non-grafting" polymerization. A part of the monovinylaromatic monomer may be replaced by unsaturated copolymerizable monomers as explained above. The same mechanism of "grafting" and "non-grafting" occurs with the comonomer, which means one portion of the monovinylaromatic monomer and of the comonomer are polymerized by grafting on the rubber and another portion of the monovinylaromatic monomer and of the comonomer are copolymerized.

The high impact monovinylaromatic polymers of the present invention can be prepared using additives. Exemplary additives include fillers such as chain transfer agents, talc, organoclays (clays wetted by an organic compatibilizer), anti oxidants, UV stabilizers, lubricants, mineral oil, silicon oil, PE waxes, plasticizers, pigments and the like. Any additive known to be useful in preparing high impact monovinylaromatic polymers to those of ordinary skill in the art of preparing such polymers can be used with the present invention.

The present invention also relates to a high impact monovinylaromatic polymer having a weight ratio of grafted monovinylaromatic monomer and optional comonomer to the initial monovinylaromatic monomer and optional comonomer above 0.1%, advantageously above 2% and preferably in the range 2 to 4%.

These polymers can be produced by the above described process. The rubbers, proportions thereof, comonomers, proportions thereof and types of monovinylaromatic monomer described above apply to said polymers.

The advantage of the present invention is that the incorporation of moderate amounts (typically 50 to 200 ppm) of borane complex initiators, and more especially amine-boranes, in the polymerization feed to make the monovinylaromatic polymer (by way of example the HiPS), leads to high and easily controllable levels of rubber grafting. It appeared surprisingly that complexed boranes exhibited a much higher selectivity than usual organic peroxides with respect to rubber grafting. Any kind of rubber phase morphology can be reached in a versatile way with moderate amounts of borane complexes. HiPS of rubber morphologies consisting of for instance capsule particles or mazes can be readily produced from a polybutadiene in styrene solution feed with less than 300 ppm of borane complexes, even with a low inversion reactor temperature (equal to or below 120° C.), preventing any excessive polymerization heat. Much higher amounts of grafting peroxides would be required for this purpose, generating high risks of reactor runaway. Consequently, the use of highly graft-selective borane derivatives allows one to manufacture general-purpose or specialty HIPS from standard styrene and polybutadiene rubbers in a versatile way, with a good control of the rubber phase particle size, size distribution and morphology, without endangering the stability of the polymerization reactors used in a standard HiPS process.

The resulting polymeric materials can be used in various uses including (non exhaustive list) fridge liners, TV front and back covers, households, electronic and electric appliances, dairy cups, food packagings, insulation foams, etc. . . .

EXAMPLES

In a jacketed reactor equipped with a coolant, a mechanical stirrer (anchor), a nitrogen supply and a thermometer are introduced 113.4 g of styrene, 7.8 g of ethylbenzene and 7.8 g of high cis polybutadiene. The reaction medium is maintained under stirring at 75 rpm and ambient temperature during 12 hours to dissolve all the polybutadiene. Then stirring is increased to 150 rpm and the reactor is purged with nitrogen for 15 minutes. A sample is taken. The reaction medium is then heated to 110° C. Once the temperature is obtained an initiator is introduced (ex 2-3) or the polymerization is made without initiator (ex 1).

Example 1 no initiator

Example 2

0.1107 mmol of tert-butyl-O-isopropylperoxycarbonate

Example 3

Triethylamine borane 12.7 mg (0.11 mmol) in 1 g of styrene

The results are displayed in the following table:

|                  | Conversion % | grafting rate % |
|------------------|--------------|-----------------|
| Ex 1 no initiator | 15          | 1.2             |
| Ex 2 peroxide    | 15           | 1.8             |
| Ex 3 amine borane | 10          | 2.2             |

The grafting rate is the ratio of grafted monovinylaromatic monomer and optional comonomer to the initial monovinylaromatic polymerized monomer and optional comonomer. The amount of grafted monomer is measured by liquid chromatography at the absorption critical point as described by H. Pash, D. Braun and E. Esser in "Macromolecules Chromatographic investigation in the critical range of liquid chromatography", XII, Analysis of block copolymers of styrene and butadiene, Int. J. Anal. Charact. 4, 501-514).

The invention claimed is:

1. A process for preparing a high impact monovinylaromatic polymer, comprising:
   admixing a rubber and at least one monovinylaromatic monomer in the presence of at least one borane complex initiator of the L-BH$_3$ type, wherein L is a Lewis base; and
   polymerizing the monovinylaromatic monomer to produce a high impact monovinylaromatic polymer.

2. The process of claim 1, wherein the step of admixing a rubber and at least one monovinylaromatic monomer also includes the step of admixing at least one comonomer; wherein the comonomer comprises alkyl esters of acrylic acid.

3. The process of claim 1, wherein, in the borane complex initiator, L is selected from the group consisting of THF, dimethylthioether and amines.

4. The process of claim 3, wherein the borane complex initiator is an amine borane.

5. The process of claim 4, wherein the borane complex initiator is triethylamine borane.

6. The process of claim 1, wherein the proportion of the borane complex initiator ranges from 1 to 10000 mg for 1000 g of monovinylaromatic monomer to be polymerized.

7. The process of claim 6, wherein the proportion of the borane complex initiator ranges from 50 to 200 ppm with respect to the weight of initial monovinylaromatic monomer to be polymerized.

8. The process of claim 1, wherein the rubber is polybutadiene.

9. The process of claim 1, wherein the rubber is present in the monovinylaromatic polymer in an amount up to 35% by weight of the high impact monovinylaromatic polymer.

10. The process of claim 1, wherein polymerizing the monovinylaromatic monomer includes grafting polymerization.

11. The process of claim 1, wherein polymerizing the monovinylaromatic monomer includes non-grafting polymerization.

12. The process of claim 9, wherein the rubber is present in the monovinylaromatic polymer in an amount from about 1 to 20% for respectively 99 to 80% of the polymerized monovinylaromatic monomer.

13. The process of claim 9, wherein the rubber is present in the monovinylaromatic polymer in an amount from about 1 to 20% for respectively 99 to 80% of a polymerized mixture of the monovinylaromatic monomer and at least one comonomer; wherein the comonomer comprises alkyl esters of acrylic acid.

14. The process of claim 12, wherein the rubber is present in the monovinylaromatic polymer in an amount from about 2 to 10% for respectively 98 to 90% of the polymerized monovinylaromatic monomer.

15. The process of claim 13, wherein the rubber is present in the monovinylaromatic polymer in an amount from about 2 to 10% for respectively 98 to 90% of a polymerized mixture of the monovinylaromatic monomer and at least one comonomer; wherein the comonomer comprises alkyl esters of acrylic acid.

16. The process of claim 1, wherein the monovinylaromatic monomer is styrene.

* * * * *